United States Patent [19]
Meyer et al.

[11] Patent Number: 5,952,567
[45] Date of Patent: Sep. 14, 1999

[54] RESTRAINT ASSEMBLY

[75] Inventors: Richard A. Meyer, Carver; Alan J. Kempainen, Eden Prairie, both of Minn.

[73] Assignee: MTS Systems Corporation, Eden Prairie, Minn.

[21] Appl. No.: 08/962,751

[22] Filed: Nov. 3, 1997

[51] Int. Cl.⁶ .................................................. G01M 17/02
[52] U.S. Cl. ............................................................ 73/146
[58] Field of Search ............................. 73/146; 188/378; 265/1; 267/153; 64/13

[56] References Cited

U.S. PATENT DOCUMENTS

| | | |
|---|---|---|
| 1,775,541 | 9/1930 | Zechlin . |
| 2,101,078 | 12/1937 | Lord et al. ................................ 64/13 |
| 2,151,134 | 3/1939 | Mitchell .................................... 265/1 |
| 4,011,021 | 3/1977 | Hartz ........................................ 403/220 |
| 4,297,877 | 11/1981 | Stahl ........................................ 73/146 |
| 4,499,759 | 2/1985 | Hull .......................................... 73/146 |
| 4,748,844 | 6/1988 | Yoshikawa et al. ...................... 73/146 |
| 4,754,652 | 7/1988 | Coulter et al. ....................... 73/862.19 |
| 4,821,582 | 4/1989 | Meyer et al. ......................... 73/862.04 |
| 5,232,073 | 8/1993 | Bronowicki et al. ................... 188/378 |
| 5,313,828 | 5/1994 | Kötzle et al. ............................. 73/146 |
| 5,449,152 | 9/1995 | Byrnes et al. ........................... 267/153 |

OTHER PUBLICATIONS

Brochure: Wheel force transducer—the key for real world simulation, Schenck ATC, Apr. 1995.
Brochure: "Hollow Shaft Rotary Encoders", Dynamics Research Corporation, Wilmington, MA (no date).
TML pam E–670 A: "TML 6–Component Wheel Force Measuring Equipment SLW–A/MFT–106", Texas Measurements, Inc. (no date).
"MMS–6800", Nissho Electric Works, Col. Ltd. (no date).

*Primary Examiner*—William Oen
*Attorney, Agent, or Firm*—Westman, Champlin & Kelly, P.A.; S. Koehler

[57] ABSTRACT

A restraint device for joining a first member to a second member and controlling relative movement of the first member with respect to the second member includes a rigid center member and a rigid annular member. The rigid annular member is concentrically disposed about the center member with respect to a common reference axis. A flexible continuous band is disposed concentrically between the center member and the annular member. The flexible continuous band joins the center member to the annular member at spaced-apart locations. The flexible continuous band is substantially rigid for moments about the common reference axis, yet compliant in other directions.

9 Claims, 9 Drawing Sheets

RESTRAINT ASSEMBLY

BACKGROUND OF THE INVENTION

The present invention relates to a restraint assembly for controlling movement of a first member relative to a second member. More particularly, a restraint assembly is disclosed that restrains angular movement of the second member relative to the first member with respect to a common axis, but is also compliant in other directions.

A number of devices have been disclosed for measuring forces and moments exerted through a rolling tire and wheel assembly. Co-pending application entitled "MULTI-AXIS LOAD CELL" with application Ser. No. 08/892,914, filed on Jul. 15, 1997, which has been assigned to the same assignee as the present application, and which is hereby fully incorporated by reference, discloses one such apparatus. Generally, the apparatus disclosed therein is a load cell having an inner central hub, an outer ring and a plurality of radially oriented tubes that join the central hub to the outer ring. Measurement sensors, such as strain sensors, are mounted to the plurality of tubes to sense strain therein. In a preferred embodiment, the strain sensors measure eight forces on the plurality of tubes. The eight forces are then transformed to provide forces along and moments about axes of an orthogonal coordinate system. The load cell is particularly well suited for measuring the force and moment components exerted through a rolling tire and wheel assembly. The load cell replaces a portion of the wheel disc, wherein the outer ring is fastened to the rim and the central hub is coupled to a spindle. Power is supplied to and output signals are obtained from the plurality of sensors by a controller through a slip ring assembly. An encoder is coupled to the load cell and provides an angular input signal to the controller indicative of the angular position of the load cell as it rotates. Using the angular input signal, the controller can calculate force and moment components with respect to a static orthogonal coordinate system, for example, a vertical force applied to the wheel assembly even though the load cell is rotating.

In order to properly calculate force and moment components with respect to the static coordinate system, such as the vertical force described above, it is necessary that the input signal from the encoder to the controller be accurate. In other words, any angular displacement of the encoder relative to the wheel rotation would lead to errors in at least some of the calculated force and moment components. Thus, there is a need to hold the encoder fixed with respect to angular displacement. However, there is also a need to allow some movement of the encoder, for example, as the wheel assembly moves up and down or experiences cornering loads.

SUMMARY OF THE INVENTION

A restraint device for joining a first member to a second member and controlling relative movement of the first member with respect to the second member includes a rigid center member and a rigid annular member. The rigid annular member is concentrically disposed about the center member with respect to a common reference axis. A flexible continuous band is disposed concentrically between the center member and the annular member. The flexible continuous band joins the center member to the annular member at spaced-apart locations. The flexible continuous band is substantially rigid for moments about the common reference axis, yet compliant in other directions.

DETAILED DESCRIPTION OF THE PREFERRED EMBODIMENTS

Figure 1:
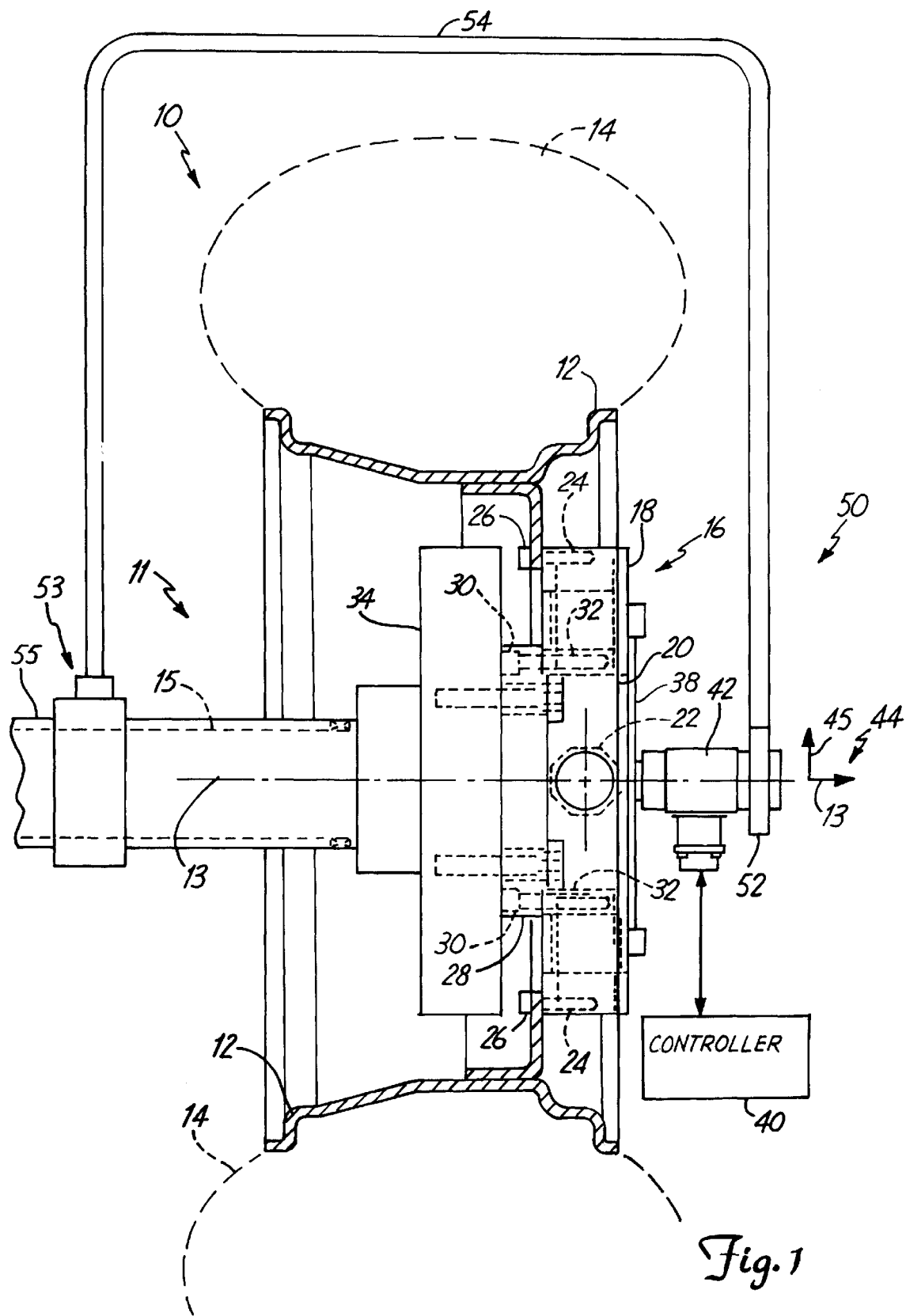
FIG. 1 illustrates the present invention in one operating environment.

FIG. 1 illustrates a typical environment in which the present invention operates. As illustrated, a tire and wheel assembly 10 is mounted to a spindle 11 having, for example, an axle 15. The tire and wheel assembly 10 rotates about a spindle axis 13. The tire and wheel assembly 10 includes a rim 12 (illustrated in section) and a tire 14 (illustrated with dashed lines). A portion of a wheel disc is replaced with a load cell 16 described in the above-referenced co-pending application. Generally, the load cell 16 includes an annular ring 18 and a central hub 20. A plurality of radially oriented tubes, one of which is illustrated at 22, joins the annular ring 18 to the central hub 20. The annular ring 18 includes threaded apertures 24 that receive a plurality of fasteners 26, to secure the load cell 16 to the rim 12. An inner mounting plate 28 is fastened to the central hub 20 using a plurality of fasteners 30 secured in corresponding threaded apertures 32 provided in the central hub 20. The inner mounting plate 28 is secured on the spindle 11 to a rotor 34.

The load cell 16 is particularly well suited for measuring the force and moment components of the tire and wheel assembly 10 as it rotates. Power is supplied to and output signals are obtained from suitable sensors mounted on the plurality of radially oriented tubes 22 through a slip ring assembly/encoder 42. A controller 40 calculates, records and/or displays the force and moment components measured by the load cell 16.

The load cell 16 measures force and moment components with respect to a local coordinate system having mutually perpendicular axes which rotates about the spindle axis 13. The load cell 16 is oriented such that one of the axes of the local coordinate system coincides with the spindle axis 13. However, the remaining axes of the local coordinate system rotate about the spindle axis 13. The encoder 42 provides an angular input signal to the controller 40 indicative of the angular position of the load cell 16 as it rotates. The controller 40 includes suitable circuits to transform or resolve the output signals received from the sensors mounted on the plurality of tubes 22 to generate output signals indicative of force and moment components with respect to a non-rotating orthogonal coordinate system 44 comprising the spindle axis 13, an axis 45 and an axis into the page of FIG. 1.

A restraint assembly so comprising an aspect of the present invention couples the encoder 42 to the spindle 11 and controls relative movement of the encoder 42 with respect to the spindle 11. In particular, the restraint assembly 50 holds the encoder 42 in a fixed angular position relative to the spindle 11 and resists unwanted angular displacement of the encoder 42 about the spindle axis 13. As discussed above, the encoder 42 provides an input signal to the controller 40 indicative of the angular position of the load cell 16 as it rotates about the spindle axis 13. Accordingly, any angular rotation of the encoder 42 about the spindle axis 13 would introduce errors in the input signal and affect the force and moment components calculated by the controller 40 with respect to the static coordinate system 44.

Generally, the restraint assembly 50 includes a restraint device 52 and a fixture 54, herein illustrated as a support bar, that is secured to a non-rotating member of the spindle 11, for example, an axle housing 55 with a mounting assembly 53. The restraint assembly 50 holds the encoder 42 in a fixed angular position relative to the spindle 11; however, the restraint assembly 50 allows limited displacement of the encoder 42 for at least some of the other degrees of freedom with respect to coordinate system 44. In particular, the restraint assembly 50 allows movement of the encoder 42 along the axes that are perpendicular to the spindle axis 13. In the embodiment illustrated, the axis 45 is oriented to be a "vertical" axis with respect to the spindle 11 so that movement of the spindle 11 along the axis 45 corresponds to up and down movement of the wheel assembly 10 as it rotates or travels along a surface. The axis into. the page of FIG. 1 is perpendicular to the spindle axis 13 and the vertical axis 45 and corresponds to a "longitudinal" axis of an associated vehicle. In a preferred embodiment, the restraint assembly 50 is substantially compliant for translational movement along the vertical and longitudinal axes. In a further preferred embodiment, the restraint assembly 50 is also substantially compliant to moments about the vertical and longitudinal axes as well as a lateral axis that is substantially parallel to the spindle axis. In this manner, the restraint assembly 50 isolates movement of the encoder 42 in these directions from causing movement of the encoder 42 about the spindle axis 13. The restraint assembly 50 thus reduces errors as the wheel assembly 10 rotates, or at least partially rotates, about the spindle axis 13.

Figure 2:
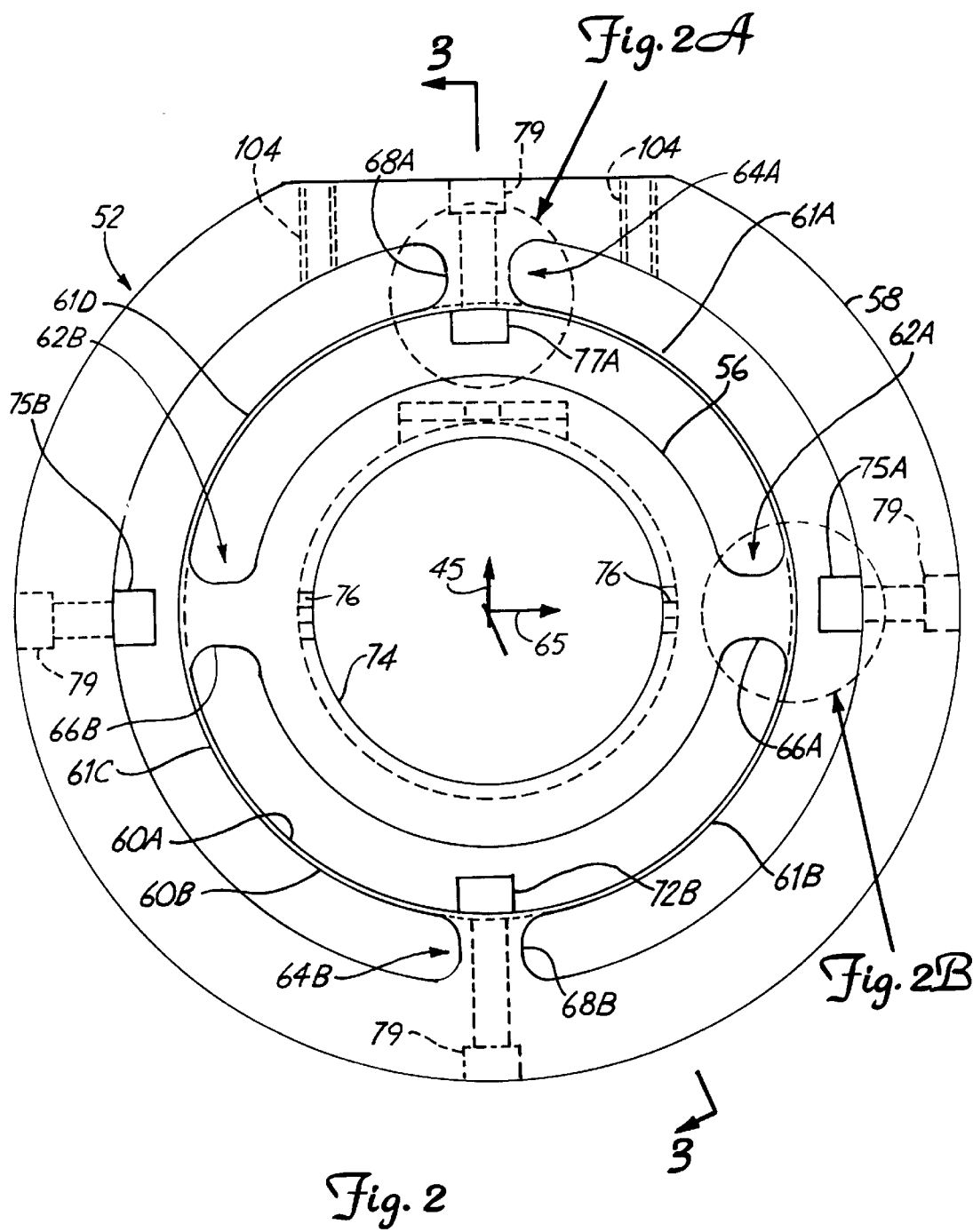
FIG. 2 is a plan view of a restraint device.
Figure 3:
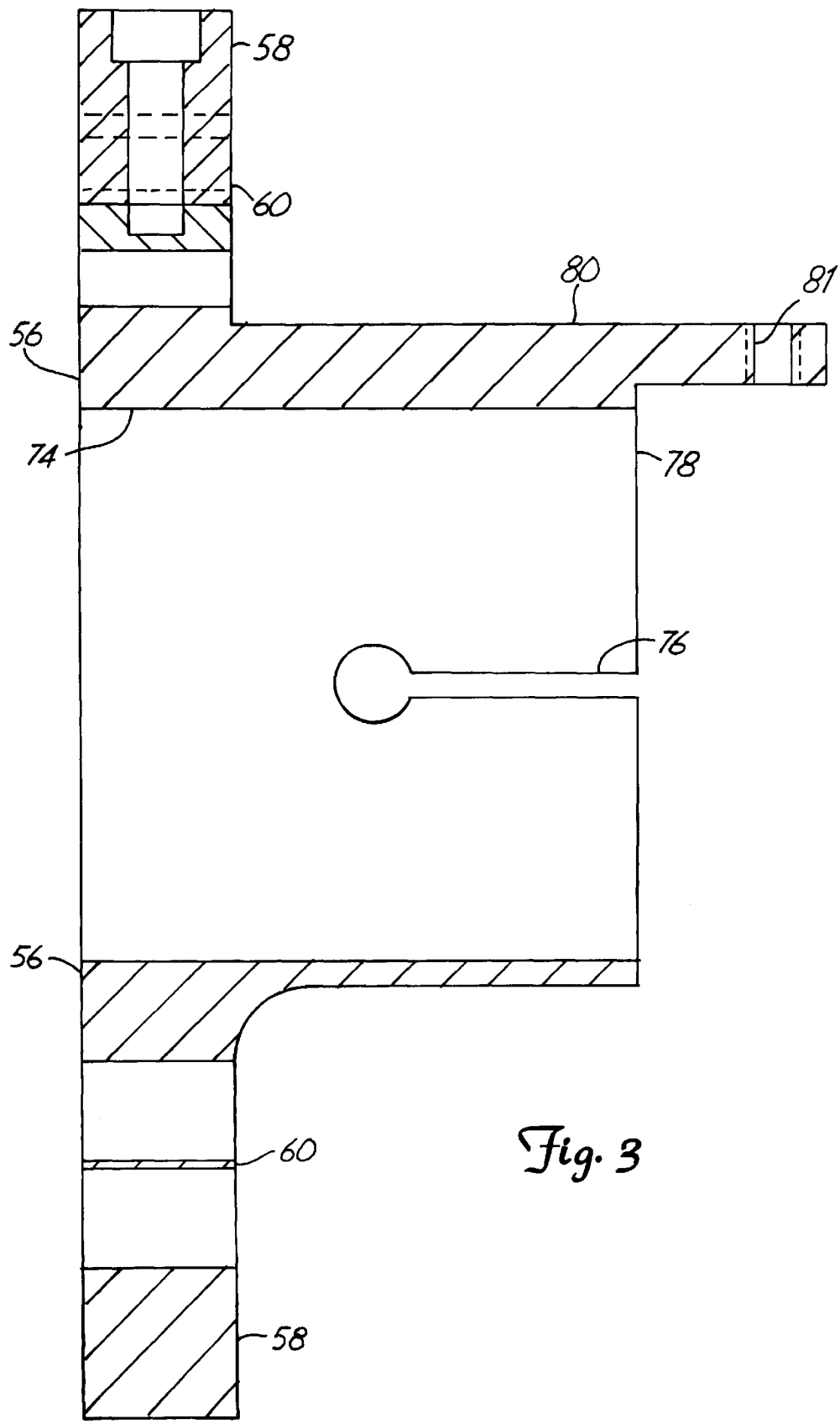
FIG. 3 is a sectional view taken along lines 3—3 of FIG. 2.
Figure 4:
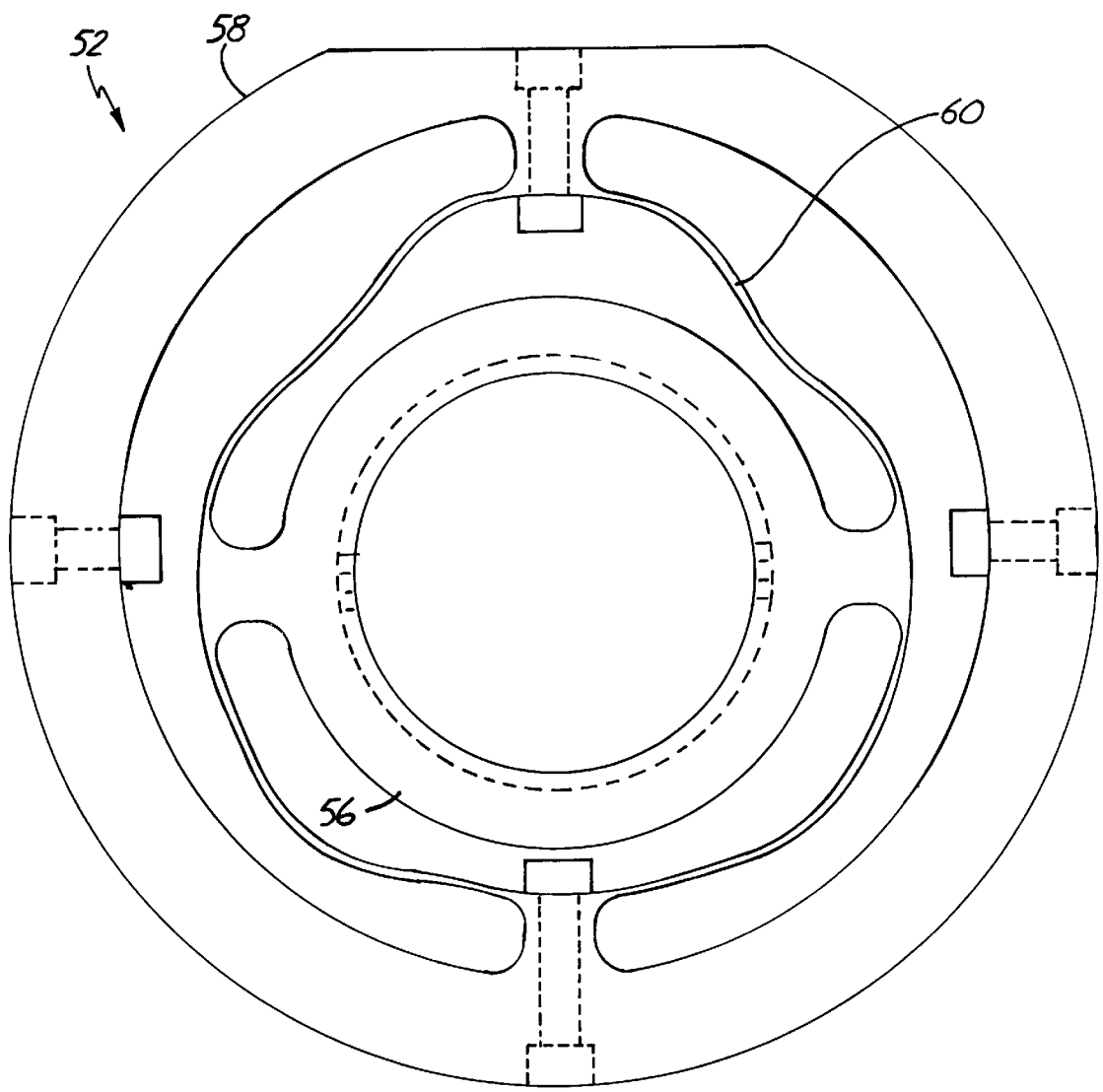
FIG. 4 is a plan view of the restraint device wherein a portion has been displaced.

A first embodiment of restraint device 52 is illustrated in FIGS. 2 and 3. Generally, the restraint device 52 includes a rigid center member 56 couplable to the encoder 42 and a rigid annular member 58 that is couplable to the spindle 11, such as through the support bar 54 illustrated in FIG. 1. The annular member 58 is concentrically disposed about the center member 56 and about a common reference axis (corresponding to the spindle axis 13 in the illustrated environment of FIG. 1), extending through the center member 56. A flexible continuous band 60 is disposed concentrically between the center member 56 and the annular member 58. The flexible continuous band 60 is joined to the center member 56 at spaced-apart locations 62A and 62B, and is joined to the annular member 58 at spaced-apart locations 64A and 64B in order to join the center member 56 to the annular member 58. The flexible continuous band 60 forms a double-cantilever structure with respect to the center member 56 and the annular member 58. The flexible continuous band 60 is substantially rigid for moments about the spindle axis 13, but is compliant for other degrees of freedom. In particular, the flexible continuous band 60 allows relative movement of the center member 56 with respect to the annular member 58 along the vertical axis 45 and the longitudinal axis (indicated by arrow 65 in FIG. 2). FIG. 4 illustrates, by way of example, movement of the center member 56 along the vertical axis 45 in an exaggerated manner. In a further preferred embodiment, the flexible continuous band 60 is constructed and affixed to the center member 56 and the annular member 58, such as shown, so as to also allow movement of the center member 56 relative to the annular member 58 about the longitudinal and vertical. In a lesser extent, the flexible continuous band 60 also allows the center member 56 to move with respect to the annular member 58 along the spindle axis 13.

In the embodiment illustrated in FIG. 2, center member posts 66A and 66B and annular member posts 68A and 68B are used to mount the flexible continuous band 60 and hold it from the center member 56 and the annular member 58, respectively. The center member posts 66A and 66B can be formed separately from, or integrally with the center member 56 as a single unitary piece. Likewise, the annular member posts 68A and 68B can be formed separately from, or integrally with the annular member 58 as a single unitary. The flexible continuous band 60 can be also formed from a separate piece and then joined to the center member posts 66A and 66B and the annular member posts 68A and 68B, or formed integral with either set of posts 66A–66B and 68A–68B, as desired. The flexible continuous band 60 can be an endless ring as illustrated, or formed from an elongated member having ends that are joined together. In the embodiment illustrated, the center member 56, the annular member 58, the center member posts 66A–66B, the annular member posts 68A–68B, and the flexible continuous band 60 are formed as an integral assembly from a single unitary piece. As used herein, the flexible continuous band 60 is defined to include an integral assembly as illustrated in FIG. 2 where the posts 66A–66B and 68A–68B are present. In such case, the flexible continuous band 60 includes flexure members 61A, 61B, 61C and 61D (preferably partially cylindrical) having a common reference axis and disposed therefrom a a common radius, wherein portions of the stops 66A–66B and 68A–68B join ends of the flexure members 61A–61D together. Preferably, two center member posts 66A–66B are provided on the center member 56 and spaced approximately 180 degrees from each other. Similarly, two annular member posts 68A–68B are provided on the annular member 58 and spaced 180 degrees from each other The annular member posts 68A–68B are mounted to the flexible continuous band 60 in a position substantially perpendicular to the center member posts 66A–66B in order to maximize compliance of the restraint device 52 for movement of the center member 56 along the axes 45 and 65.

Figure 2A:
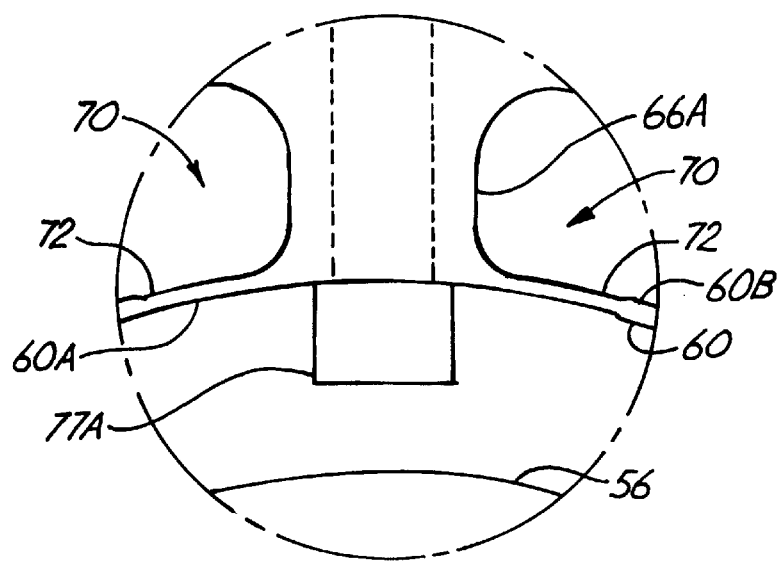
FIGS. 2A and 2B are enlarged detailed views of portions of FIG. 2.
Figure 2B:
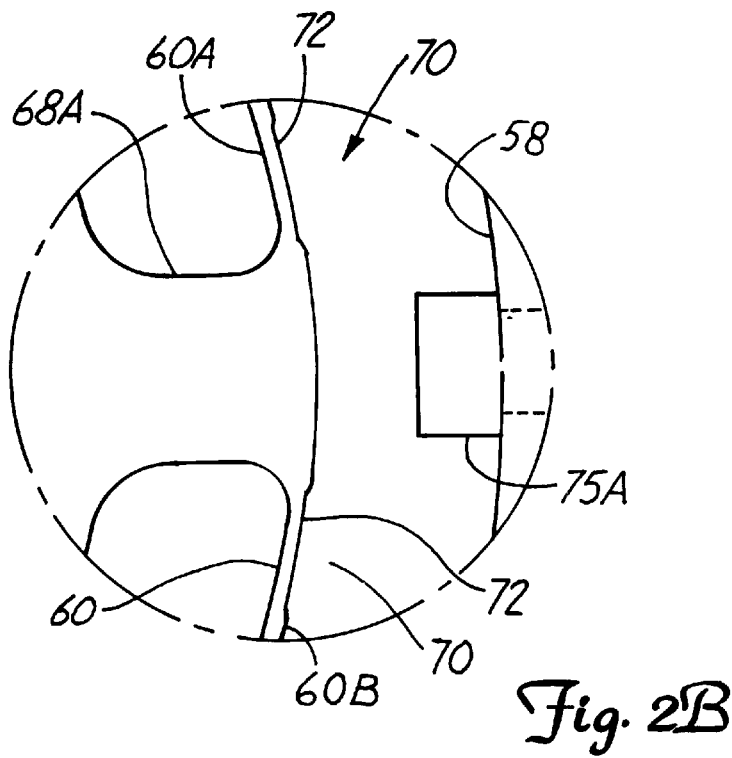

In the preferred embodiment in FIG. 2, the flexible continuous band 60 is a thin cylindrical member having an inner surface 60A facing the center member 56 and an outer surface 60B facing the annular member 58. As a cylindrical or tubular element, the flexible continuous band 60 is particularly stiff for moments about the spindle axis 13. In yet a further preferred embodiment, the flexible continuous band 60 includes portions having reduced section to provide portions of increased compliance relative to other portions of the band 60. In one embodiment, the portions of reduced section include portions of reduced thickness 70 adjacent each of the posts 66A–66B and 68A–68B, as illustrated in FIGS. 2A and 2B. The portions of reduced thickness 70 increase the compliance of the flexible continuous band 60 in degrees of freedom other than the moment about the spindle axis 13. The portions of reduced thickness 70 are formed by providing recesses or depressions 72 in the flexible continuous band 60. Preferably, the recesses 72 are oriented such as to open to either the inner surface 60A of the flexible continuous band 60 or, as illustrated, to the outer surface 60B of the flexible continuous band 60. Orientation of the recesses 72 in this manner maintains at least a minimum desired thickness of the flexible continuous band 60 circumferentially about the spindle axis 13 in order to concentrate stress therein and increase torsional stiffness to moments about the spindle axis 13.

Figure 11:
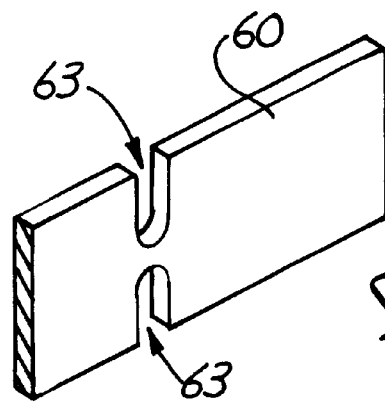
FIG. 11 is a perspective view of a portion of a flexible band.

FIG. 11 illustrates a second embodiment for providing portions of reduced section or increased compliance in the band 60. In this embodiment, the band 60 includes notches 63 formed inward from edges of the band 60. Although illustrated with two notches 63, a single notch or more than two notches can be provided. As appreciated by those skilled in the art, other means can be provided to form the band 60 with portions of increased compliance, such as providing apertures in the band 60.

Referring back to FIGS. 2 and 3, the center member 56 is provided with an aperture 74 through which a portion of the encoder 42 can extend through for purposes of mounting. The center member 56 includes slots 76 extending into the center member 56 from an end 78, the slots 76 being substantially parallel to the spindle axis 13. A suitable clamp, not shown, then can be used to compress the center member 56 against the encoder 42. If desired, an extending flange 80 can be provided on the center member 56 where a suitable aperture 81 is provided to receive a fastener, not shown, that engages the encoder 42.

In the embodiment of FIGS. 2 and 3, stops are provided on the restraint device 52 opposite at least some of the posts 66A–66B and 68A–68B. In the embodiment illustrated, stops 75A and 75B are disposed on the annular member 58 and limit displacement of the center member 56 along the axis 65, while stops 77A and 77B extend from the posts 68A and 68B to limit displacement of the center member 56 along the vertical axis 45. The stops 75A–75B and 77A–77B are separately formed and attached to the annular member 58 with suitable fasteners indicated at 79; however, if desired, the stops 75A–75B and 77A–77B can be formed integrally with the annular member 58. As appreciated by those skilled in the art, some or all of the stops can be secured to the center member 56. If desired, stop surfaces of the stops can be concave to conform the center member 56 or to the posts 66A–66B.

Figure 5:
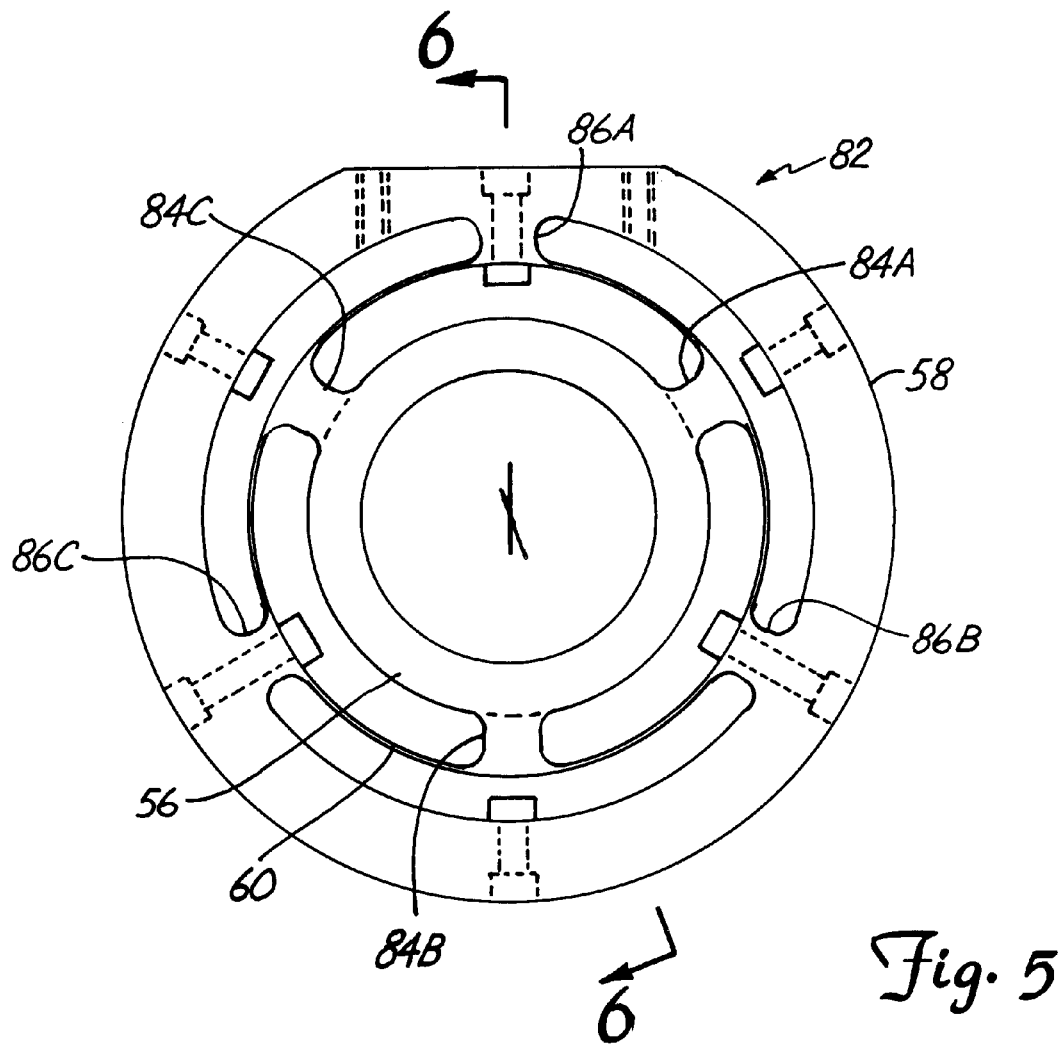
FIG. 5 is a plan view of a second embodiment of a restraint device.

FIG. 5 illustrates a restraint device 82 having three center member posts 84A, 84B and 84C. The center member posts 84A–84C are disposed about the center member 56 at equal angular intervals. In this embodiment, the annular member 58 is also provided with three angular member posts 86A, 86B and 86C disposed at equal angular intervals about the spindle axis 13 and wherein one of the angular member posts 86A–86C is interposed between each successive pair of the center member posts 84A–84C.

Figure 6:
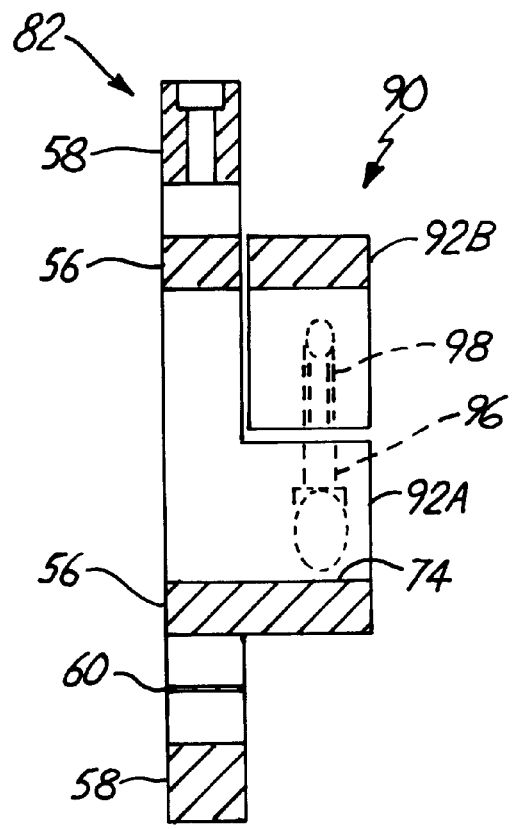
FIG. 6 is a sectional view of the restraint device taken along lines 6—6 in FIG. 5.
Figure 7:
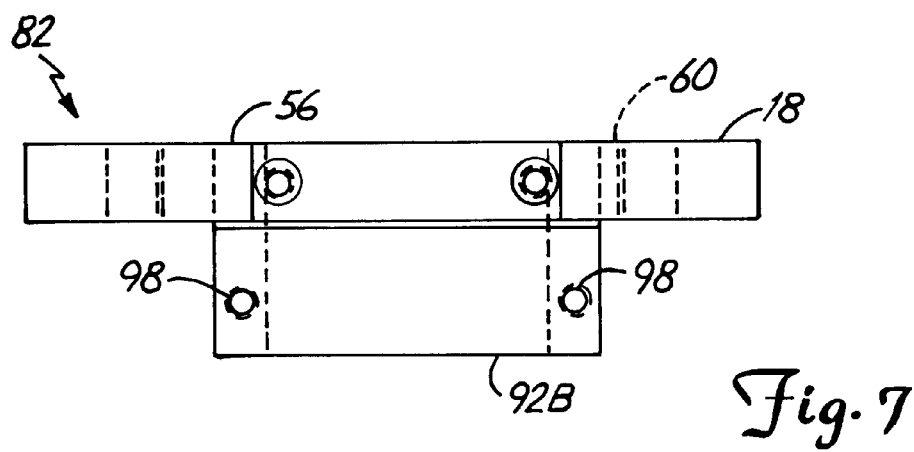
FIG. 7 is a top plan view of the restraint device of FIG. 5.

FIGS. 6 and 7 illustrate a split clamp assembly 90 for mounting the restraint device 82 to the encoder 42. The split clamp assembly 90 includes a first portion 92A integrally formed with the center member 56. A second portion 92B aligns with the first portion 92A and forms a portion of the aperture 74 through which the encoder 42 can extend. Fasteners, not shown, extend through apertures 96 and 98 to secure the second portion 92A to the first portion 92B.

Figure 8:
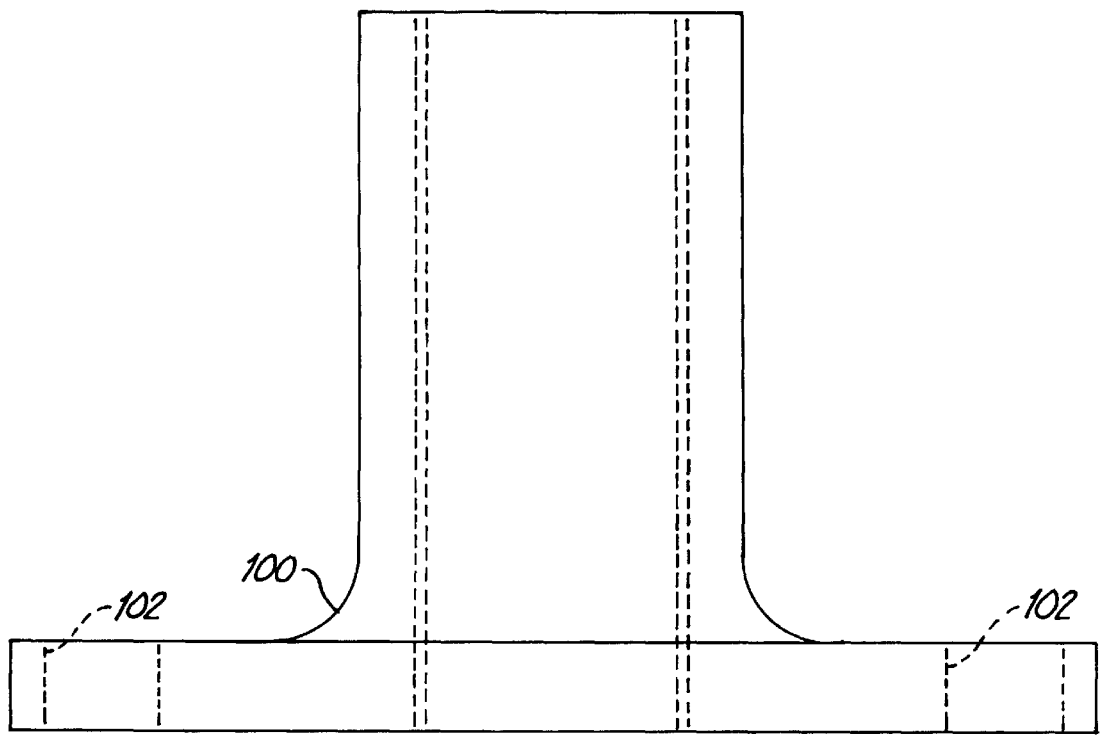
FIG. 8 is a side elevational view of a mounting plate.
Figure 9:
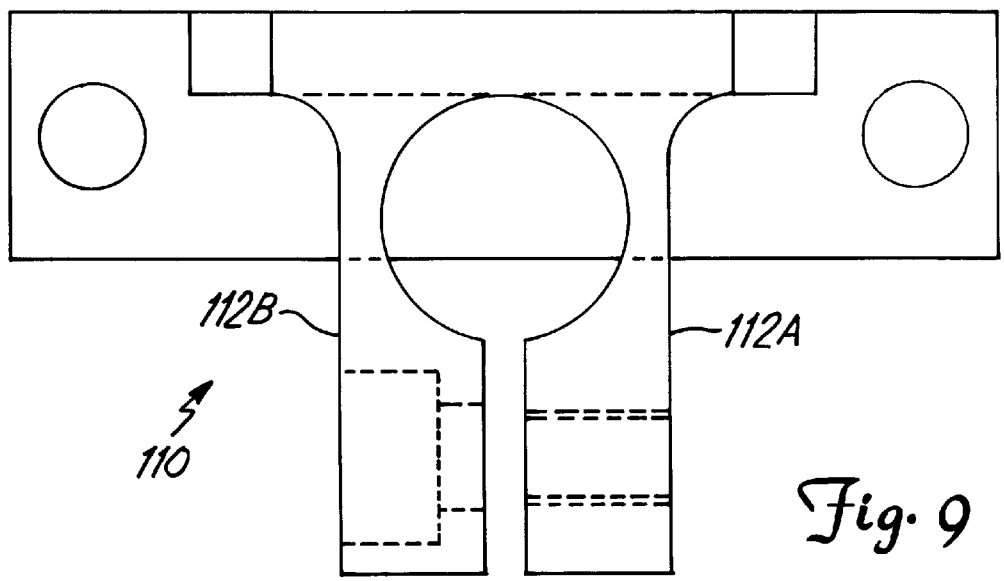
FIG. 9 is a top plan view of a second embodiment of a mounting plate.
Figure 10:
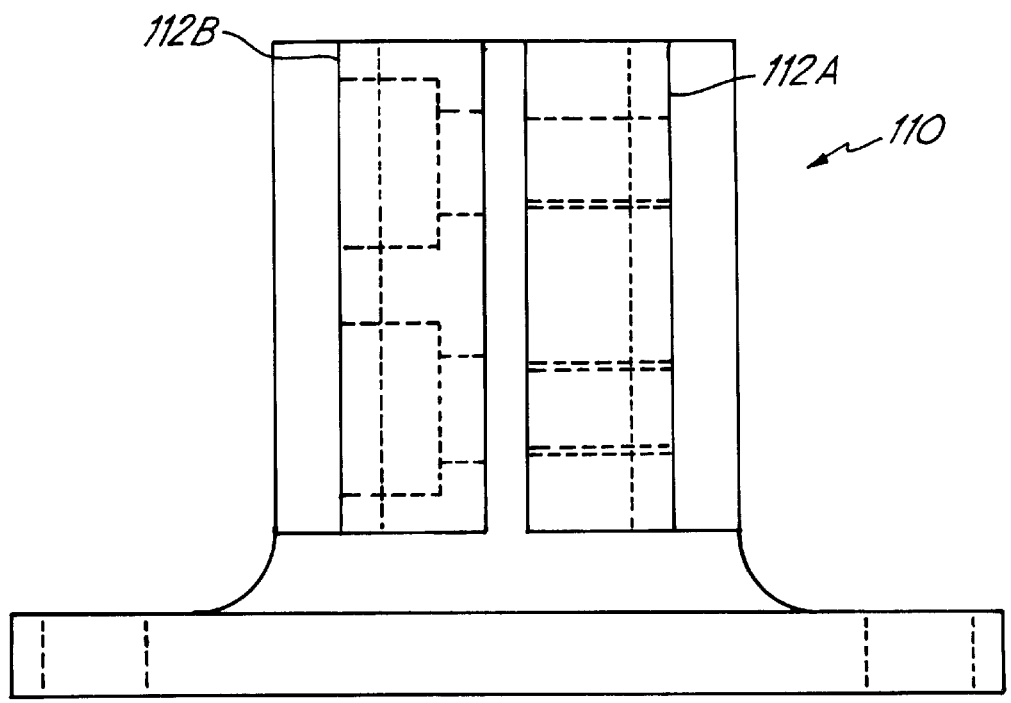
FIG. 10 is a side elevational view of the mounting plate of FIG. 9.

In the embodiment illustrated in FIG. 1, the support bar 54 is removably secured to the annular member 58 in order to facilitate convenient installation and removal of the restraint device 52, the encoder 42, the load cell 16 and/or the wheel assembly 10 from the spindle 11. In a first embodiment illustrated in FIG. 8, a mounting plate 100 is removably secured to the annular member 58 with suitable fasteners extending through apertures 102 and received by threaded apertures 104 (FIG. 2). The mounting plate 100 includes a threaded aperture 106 that receives an end of the support bar 54. FIG. 9 and 10 illustrate a second mounting plate 110 also removably secured to the annular member 58 using the apertures 104. The mounting plate 110 includes a split clamp assembly 112 formed from portions 112A and 112B held together with suitable fasteners. The split clamp assembly 112 slidably receives the end of the support bar 54.

The restraint assembly 50 of the present invention provides a low cost, easy to manufacture system for restraining a device, such as the encoder 42, from angular displacement. Each of the components can be manufactured from any suitable material such as aluminum, steel, stainless steel, beryllium copper, composite materials, plastic, or any combinations thereof. Although the restraint devices 52 and 82 are positioned away from a center line of the wheel assembly 10, the design of the restraint devices 52 and 82 realize a small compact structure that minimizes overall mass, thereby negligibly impacting any testing procedures or results.

Although the present invention has been described with reference to preferred embodiments, workers skilled in the art will recognize that changes may be made in form and detail without departing from the spirit and scope of the invention.

What is claimed is:

1. A restraint device for joining a first member to a second member and controlling relative movement of the first member with respect to the second member, the restraint device comprising:
    a rigid center member couplable to the first member;
    a rigid annular member concentrically disposed about the center member and having a reference axis extending therethrough, the annular member being couplable to the second member; and
    a flexible continuous band disposed concentrically between the center member and the annular member, the flexible member being joined to the center member at spaced-apart locations and being joined to the annular member at spaced-apart locations, the flexible band being substantially rigid for moments about the reference axis.

2. The restraint device of claim 1 wherein the flexible band is formed integrally from a single unitary piece with at least one of the center member and the annular member.

3. The restraint device of claim 2 wherein the center member, the annular member and the flexible band are integrally formed from a single unitary piece.

4. The restraint device of claim 1 wherein the flexible band is joined to the center member at at least two spaced-apart locations.

5. The restraint device of claim 1 wherein the flexible band is joined to the annular member at at least two spaced-apart locations.

6. The restraint device of claim 1 wherein the flexible band includes a portion of reduced thickness adjacent each spaced-apart location joining the flexible band to the center member and annular member.

7. The restraint device of claim 6 wherein the flexible band includes an outer surface facing the annular member and wherein each recess opens to the outer surface.

8. The restraint device of claim 6 wherein the flexible band includes an inner surface facing the center member and wherein each recess opens to the inner surface.

9. A restraint device for joining a first member to a second member and controlling relative movement of the first member with respect to the second member, the restraint device comprising:

a rigid center member couplable to the first member to move therewith, the rigid center member having spaced-apart center member posts extending outwardly from the center member and from a reference axis extending through the center member;

a rigid annular member couplable to the second member to move therewith, the annular member being disposed concentrically about the center member and having spaced-apart annular member posts extending inwardly toward the center member and the reference axis; and a flexible band disposed concentrically between the center member and the annular member and joined to each of the posts, the flexible band rigid moments about the reference axis.

* * * * *

UNITED STATES PATENT AND TRADEMARK OFFICE
CERTIFICATE OF CORRECTION

PATENT NO. : 5,952,567
DATED : September 14, 1999
INVENTOR(S) : Richard A. Meyer, et al.

It is certified that error appears in the above-identified patent and that said Letters Patent is hereby corrected as shown below:

Col. 6, Claim 1, line 49, remove the first occurrence of "member" and insert --band--.

Col. 7, Claim 7, line 5, after "each" insert --portion of reduced thickness comprises a--.

Col. 7, Claim 7, line 5, cancel "opens" and insert --opening--.

Col. 7, Claim 8, line 8, after "each" insert --portion of reduced thickness comprises a--.

Col. 7, Claim 8, line 8, cancel "opens" and insert --opening--.

Col. 8, Claim 9, line 11, after "band" insert --being substantially--.

Col. 8, Claim 9, line 11, after "rigid" insert --for--.

Signed and Sealed this

Twenty-sixth Day of September, 2000

Attest:

Q. TODD DICKINSON

*Attesting Officer*     *Director of Patents and Trademarks*